(12) United States Patent
Achkinazi et al.

(10) Patent No.: US 11,907,537 B2
(45) Date of Patent: Feb. 20, 2024

(54) STORAGE SYSTEM WITH MULTIPLE TARGET CONTROLLERS SUPPORTING DIFFERENT SERVICE LEVEL OBJECTIVES

(71) Applicant: Dell Products L.P., Round Rock, TX (US)

(72) Inventors: Igor Achkinazi, Northborough, MA (US); Tal Abir, Nesher (IL)

(73) Assignee: Dell Products L.P., Round Rock, TX (US)

( * ) Notice: Subject to any disclaimer, the term of this patent is extended or adjusted under 35 U.S.C. 154(b) by 168 days.

(21) Appl. No.: 17/714,312

(22) Filed: Apr. 6, 2022

(65) Prior Publication Data

US 2023/0325084 A1 Oct. 12, 2023

(51) Int. Cl.
*G06F 3/06* (2006.01)
(52) U.S. Cl.
CPC .............. *G06F 3/061* (2013.01); *G06F 3/067* (2013.01); *G06F 3/0658* (2013.01); *G06F 3/0664* (2013.01); *G06F 3/0688* (2013.01)
(58) Field of Classification Search
CPC ...... G06F 3/061; G06F 3/0658; G06F 3/0664; G06F 3/067; G06F 3/0688
See application file for complete search history.

(56) References Cited

U.S. PATENT DOCUMENTS

| | | | |
|---|---|---|---|
| 10,310,760 B1 | 6/2019 | Dreier et al. | |
| 10,893,105 B1 | 1/2021 | Bono et al. | |
| 2003/0149773 A1 | 8/2003 | Harbin et al. | |
| 2009/0154472 A1 | 6/2009 | Chung et al. | |
| 2013/0198312 A1 | 8/2013 | Tamir et al. | |
| 2013/0226887 A1 | 8/2013 | Braam et al. | |
| 2014/0180740 A1* | 6/2014 | Dasgupta | G06Q 10/063112 705/7.14 |
| 2015/0012607 A1 | 1/2015 | Cayton et al. | |
| 2015/0317091 A1* | 11/2015 | Hussain | G06F 3/065 711/103 |

(Continued)

OTHER PUBLICATIONS

U.S. Appl. No. 17/578,609 filed in the name of Xiangping Chen et al. filed Jan. 19, 2022, and entitled "Intelligent Target Routing in a Distributed Storage System."

(Continued)

*Primary Examiner* — Michelle T Bechtold
(74) *Attorney, Agent, or Firm* — Ryan, Mason & Lewis, LLP

(57) ABSTRACT

First and second target controllers implemented in a storage system are associated with respective first and second storage pools having respective first and second service level objectives. Input-output (IO) operations are received from one or more host devices and processed in the storage system, with different ones of the IO operations being directed from one or more initiators of the one or more host devices to different ones of the first and second target controllers. Separate feedback information is provided from the storage system to the one or more host devices for respective ones of the first and second target controllers, so as to permit different amounts of throttling of additional IO operations in the one or more host devices based at least in part on whether those additional IO operations are to be directed to the first target controller or the second target controller.

20 Claims, 7 Drawing Sheets

(56) References Cited

U.S. PATENT DOCUMENTS

| | | | |
|---|---|---|---|
| 2017/0177222 A1 | 6/2017 | Singh et al. | |
| 2019/0028407 A1* | 1/2019 | Perumal Vijayan | H04L 67/61 |
| 2020/0019521 A1 | 1/2020 | Solanki et al. | |
| 2020/0026606 A1 | 1/2020 | Farnum et al. | |
| 2020/0280511 A1* | 9/2020 | Gapin | H04L 67/141 |
| 2022/0197819 A1* | 6/2022 | Kumar | G06F 12/109 |
| 2022/0377027 A1* | 11/2022 | Gai | H04L 45/74 |
| 2023/0008395 A1* | 1/2023 | Kobayashi | G06F 3/0613 |

OTHER PUBLICATIONS

Storpool Storage, "Demystifying: What is NVMeOF?" https://storpool.com/blog/demystifying-what-is-nvmeof, Sep. 12, 2017, 4 pages.

VMware, "VMware ESX Server," Product Datasheet, 2007, 4 pages.

Wikipedia, "Host Adapter," https://en.wikipedia.org/wiki/Host_adapter, Jul. 19, 2021, 4 pages.

Wikipedia, "iSCSI," https://en.wikipedia.org/wiki/ISCSI, Dec. 22, 2021, 10 pages.

Wikipedia, "NVM Express," https://en.wikipedia.org/wiki/NVM_Express, Jan. 13, 2022, 18 pages.

A. S. Gillis, "NVMe Over Fabrics (NVMe-oF)," https://searchstorage.techtarget.com/definition/NVMe-over-Fabrics-Nonvolatile-Memory-Express-over-Fabrics?vgnextfmt=print, Jan. 15, 2020, 5 pages.

Wikipedia, "Remote Direct Memory Access," https://en.wikipedia.org/wiki/Remote_direct_memory_access, Jan. 30, 2021, 3 pages.

M. Hoyt, "ScaleIO Tech Overview and Concepts: SDS-SAN vs SDS-Array," https://www.thinkahead.com/TheLAB/scaleio-tech-overview-concepts-sds-san-vs-sds-array/, Apr. 5, 2017, 16 pages.

EMC Corporation, "EMC ScaleIO Architectural and Functional Overview," EMC White Paper, Dec. 2013, 13 pages.

Dell EMC, "Dell EMC VxFlex OS: Networking Best Practices and Design Considerations," Dell EMC White Paper, Jul. 2018, 38 pages.

R. Kerns, "What is Block I/O?" searchstorage.techtarget.com/answer/What-is-block-I-O, Oct. 19, 2005, 2 pages.

Janalta Interactive, "Client-Side" https://www.techopedia.com/definition/439/client-side, Accessed Jan. 14, 2022, 8 pages.

EMC Corporation, "EMC ScaleIO Design Considerations and Best Practices," EMC White Paper, Jun. 2016, 30 pages.

Mellanox Technologies, "RoCE vs. iWARP Competitive Analysis," White Paper, Feb. 2017, 6 pages.

NVM Express, "NVM Express Base Specification, Revision 2.0a," NVM Express, Jul. 23, 2021, 454 pages.

U.S. Appl. No. 17/326,452 filed in the name of Sanjib Mallick et al. filed May 21, 2021, and entitled "Write Pressure Throttling Based on Service Level Objectives."

U.S. Appl. No. 17/361,666 filed in the name of Xiangping Chen et al. filed Jan. 19, 2022, and entitled "Intelligent Target Routing in a Distributed Storage System."

U.S. Appl. No. 17/696,360 filed in the name of Sanjib Mallick et al. filed Mar. 16, 2022, and entitled "Intelligent Path Selection in a Distributed Storage System."

* cited by examiner

STORAGE SYSTEM WITH MULTIPLE TARGET CONTROLLERS SUPPORTING DIFFERENT SERVICE LEVEL OBJECTIVES

FIELD

The field relates generally to information processing systems, and more particularly to storage in information processing systems.

BACKGROUND

Information processing systems often include distributed storage systems comprising multiple storage nodes. These distributed storage systems are often dynamically reconfigurable under software control in order to adapt the number and type of storage nodes and the corresponding system storage capacity as needed, in an arrangement commonly referred to as a software-defined storage system. For example, in a typical software-defined storage system, storage capacities of multiple distributed storage nodes are pooled together into one or more storage pools. For applications running on a host device that utilizes the software-defined storage system, such a storage system provides a logical storage object view to allow a given application to store and access data, without the application being aware that the data is being dynamically distributed among different storage nodes potentially at different sites. In these and other software-defined storage system arrangements, it can be difficult to implement different levels of service for respective different applications or different application processes when using advanced storage access protocols such as Non-Volatile Memory Express (NVMe) over Fabrics, also referred to as NVMeF, or NVMe over Transmission Control Protocol (TCP), also referred to as NVMe/TCP.

SUMMARY

Illustrative embodiments disclosed herein provide techniques for utilizing multiple target controllers to support different service level objectives (SLOs) in a software-defined storage system or other type of distributed storage system. Such techniques advantageously facilitate the usage of advanced storage access protocols such as NVMeF or NVMe/TCP while avoiding the above-described drawbacks of conventional practice. For example, some embodiments can easily implement different SLOs for respective different applications or different application processes running on one or more host devices.

Such embodiments can provide significant advantages, such as, for example, guaranteeing particular performance levels for critical applications that require high throughput and low latency, despite the limited storage resources of a given storage system implementation. These embodiments can additionally or alternatively ensure that particular applications are not receiving levels of performance that are significantly higher or lower than those specified in their service level agreements.

Although some embodiments are described herein in the context of implementing an NVMeF or NVMe/TCP access protocol in a software-defined storage system, it is to be appreciated that other embodiments can be implemented in other types of distributed storage systems using other storage access protocols.

In addition, the disclosed techniques can be implemented in other embodiments in stand-alone storage arrays or other types of storage systems that are not distributed across multiple storage nodes. Accordingly, the disclosed techniques are applicable to a wide variety of different types of storage systems.

In one embodiment, an apparatus comprises at least one processing device that includes a processor coupled to a memory. The at least one processing device is configured to implement a first target controller in a storage system, the first target controller being associated with a first storage pool of the storage system and having a first SLO, and to implement a second target controller in the storage system, the second target controller being associated with a second storage pool of the storage system and having a second SLO different than the first SLO. The at least one processing device is further configured to process input-output (IO) operations received in the storage system from one or more host devices, with different ones of the IO operations being directed by the one or more host devices from one or more initiators of the one or more host devices to different ones of the first and second target controllers, and to provide separate feedback information from the storage system to the one or more host devices for respective ones of the first and second target controllers, so as to permit different amounts of throttling of additional IO operations in the one or more host devices based at least in part on whether those additional IO operations are to be directed to the first target controller or the second target controller.

In some embodiments, the one or more initiators of the one or more host devices and the first and second target controllers of the storage system are implemented in accordance with an NVMeF or NVMe/TCP access protocol, although a wide variety of other designated standard storage access protocols can be used.

As indicated above, the storage system in some embodiments illustratively comprises a distributed storage system that includes a plurality of storage nodes. The distributed storage system may more particularly comprise, for example, a software-defined storage system in which the storage nodes illustratively comprise respective software-defined storage server nodes of the software-defined storage system.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources, as well as other types of systems comprising a combination of cloud and edge infrastructure. Numerous different types of enterprise computing and storage systems are also encompassed by the term "information processing system" as that term is broadly used herein.

Figure 1:
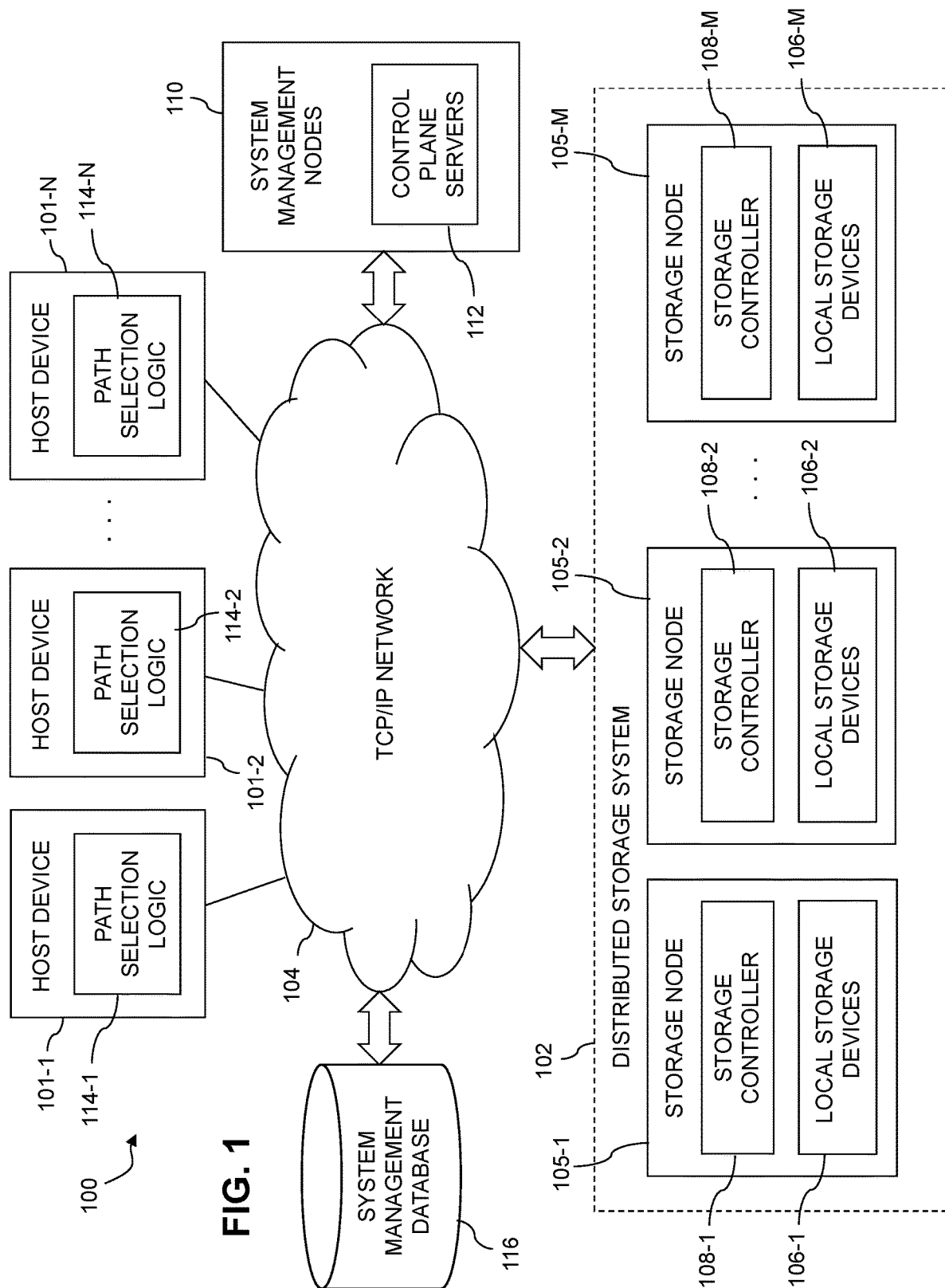
FIG. 1 is a block diagram of an information processing system incorporating functionality for multiple target controllers supporting different SLOs in a distributed storage system in an illustrative embodiment.

FIG. 1 shows an information processing system 100 configured in accordance with an illustrative embodiment. The information processing system 100 comprises a plurality of host devices 101-1, 101-2, . . . 101-N, collectively referred to herein as host devices 101, and a distributed storage system 102 shared by the host devices 101. The host devices 101 and distributed storage system 102 in this embodiment are configured to communicate with one another via a network 104 that illustratively utilizes protocols such as Transmission Control Protocol (TCP) and/or Internet Protocol (IP), and is therefore referred to herein as a TCP/IP network, although it is to be appreciated that the network 104 can operate using additional or alternative protocols. In some embodiments, the network 104 comprises a storage area network (SAN) that includes one or more Fibre Channel (FC) switches, Ethernet switches or other types of switch fabrics.

The distributed storage system 102 more particularly comprises a plurality of storage nodes 105-1, 105-2, . . . 105-M, collectively referred to herein as storage nodes 105. The values N and M in this embodiment denote arbitrary integer values that in the figure are illustrated as being greater than or equal to three, although other values such as N=1, N=2, M=1 or M=2 can be used in other embodiments.

The storage nodes 105 collectively form the distributed storage system 102, which is just one possible example of what is generally referred to herein as a "distributed storage system." Other distributed storage systems can include different numbers and arrangements of storage nodes, and possibly one or more additional components. For example, as indicated above, a distributed storage system in some embodiments may include only first and second storage nodes, corresponding to an M=2 embodiment. Some embodiments can configure a distributed storage system to include additional components in the form of a system manager implemented using one or more additional nodes.

In some embodiments, the distributed storage system 102 provides a logical address space that is divided among the storage nodes 105, such that different ones of the storage nodes 105 store the data for respective different portions of the logical address space. Accordingly, in these and other similar distributed storage system arrangements, different ones of the storage nodes 105 have responsibility for different portions of the logical address space. For a given logical storage volume, logical blocks of that logical storage volume are illustratively distributed across the storage nodes 105.

Other types of distributed storage systems can be used in other embodiments. For example, distributed storage system 102 can comprise multiple distinct storage arrays, such as a production storage array and a backup storage array, possibly deployed at different locations. Accordingly, in some embodiments, one or more of the storage nodes 105 may each be viewed as comprising at least a portion of a separate storage array with its own logical address space. Alternatively, the storage nodes 105 can be viewed as collectively comprising one or more storage arrays. The term "storage node" as used herein is therefore intended to be broadly construed.

In some embodiments, the distributed storage system 102 comprises a software-defined storage system and the storage nodes 105 comprise respective software-defined storage server nodes of the software-defined storage system, such nodes also being referred to herein as SDS server nodes, where SDS denotes software-defined storage. Accordingly, the number and types of storage nodes 105 can be dynamically expanded or contracted under software control in some embodiments. Examples of such software-defined storage systems will be described in more detail below in conjunction with FIG. 3.

It is to be appreciated, however, that techniques disclosed herein can be implemented in other embodiments in stand-alone storage arrays or other types of storage systems that are not distributed across multiple storage nodes. The disclosed techniques are therefore applicable to a wide variety of different types of storage systems. The distributed storage system 102 is just one illustrative example.

In the distributed storage system 102, each of the storage nodes 105 is illustratively configured to interact with one or more of the host devices 101. The host devices 101 illustratively comprise servers or other types of computers of an enterprise computer system, cloud-based computer system or other arrangement of multiple compute nodes, each associated with one or more system users.

The host devices 101 in some embodiments illustratively provide compute services such as execution of one or more applications on behalf of each of one or more users associated with respective ones of the host devices 101. Such applications illustratively generate input-output (IO) operations that are processed by a corresponding one of the storage nodes 105. The term "input-output" as used herein refers to at least one of input and output. For example, IO operations may comprise write requests and/or read requests directed to logical addresses of a particular logical storage volume of one or more of the storage nodes 105. These and other types of IO operations are also generally referred to herein as IO requests.

The IO operations that are currently being processed in the distributed storage system 102 in some embodiments are referred to herein as "in-flight" IOs that have been admitted by the storage nodes 105 to further processing within the system 100. The storage nodes 105 are illustratively configured to queue IO operations arriving from one or more of the host devices 101 in one or more sets of IO queues.

The storage nodes 105 illustratively comprise respective processing devices of one or more processing platforms. For example, the storage nodes 105 can each comprise one or more processing devices each having a processor and a memory, possibly implementing virtual machines and/or containers, although numerous other configurations are possible.

The storage nodes 105 can additionally or alternatively be part of cloud infrastructure, such as a cloud-based system implementing Storage-as-a-Service (STaaS) functionality.

The storage nodes 105 may be implemented on a common processing platform, or on separate processing platforms.

The host devices 101 are illustratively configured to write data to and read data from the distributed storage system 102 comprising storage nodes 105 in accordance with applications executing on those host devices 101 for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise. Combinations of cloud and edge infrastructure can also be used in implementing a given information processing system to provide services to users.

Communications between the components of system 100 can take place over additional or alternative networks, including a global computer network such as the Internet, a wide area network (WAN), a local area network (LAN), a satellite network, a telephone or cable network, a cellular network such as 4G or 5G cellular network, a wireless network such as a WiFi or WiMAX network, or various portions or combinations of these and other types of networks. The system 100 in some embodiments therefore comprises one or more additional networks other than network 104 each comprising processing devices configured to communicate using TCP, IP and/or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand or Gigabit Ethernet, in addition to or in place of FC. Numerous alternative networking arrangements are possible in a given embodiment, as will be appreciated by those skilled in the art. Other examples include remote direct memory access (RDMA) over Converged Ethernet (ROCE) or InfiniBand over Ethernet (IBoE).

The first storage node 105-1 comprises a plurality of storage devices 106-1 and an associated storage controller 108-1. The storage devices 106-1 illustratively store metadata pages and user data pages associated with one or more storage volumes of the distributed storage system 102. The storage volumes illustratively comprise respective logical units (LUNs) or other types of logical storage volumes. The storage devices 106-1 more particularly comprise local persistent storage devices of the first storage node 105-1. Such persistent storage devices are local to the first storage node 105-1, but remote from the second storage node 105-2, the storage node 105-M and any other ones of other storage nodes 105.

Each of the other storage nodes 105-2 through 105-M is assumed to be configured in a manner similar to that described above for the first storage node 105-1. Accordingly, by way of example, storage node 105-2 comprises a plurality of storage devices 106-2 and an associated storage controller 108-2, and storage node 105-M comprises a plurality of storage devices 106-M and an associated storage controller 108-M.

As indicated previously, the storage devices 106-2 through 106-M illustratively store metadata pages and user data pages associated with one or more storage volumes of the distributed storage system 102, such as the above-noted LUNs or other types of logical storage volumes. The storage devices 106-2 more particularly comprise local persistent storage devices of the storage node 105-2. Such persistent storage devices are local to the storage node 105-2, but remote from the first storage node 105-1, the storage node 105-M, and any other ones of the storage nodes 105. Similarly, the storage devices 106-M more particularly comprise local persistent storage devices of the storage node 105-M. Such persistent storage devices are local to the storage node 105-M, but remote from the first storage node 105-1, the second storage node 105-2, and any other ones of the storage nodes 105.

The local persistent storage of a given one of the storage nodes 105 illustratively comprises the particular local persistent storage devices that are implemented in or otherwise associated with that storage node. It is assumed that such local persistent storage devices of the given storage node are accessible to the storage controller of that node via a local interface, and are accessible to storage controllers 108 of respective other ones of the storage nodes 105 via remote interfaces. For example, it is assumed in some embodiments disclosed herein that each of the storage devices 106 on a given one of the storage nodes 105 can be accessed by the given storage node via its local interface, or by any of the other storage nodes 105 via an RDMA interface. A given storage application executing on the storage nodes 105 illustratively requires that all of the storage nodes 105 be able to access all of the storage devices 106. Such access to local persistent storage of each node from the other storage nodes can be performed, for example, using the RDMA interfaces with the other storage nodes, although numerous other arrangements are possible.

The storage controllers 108 of the storage nodes 105 may include additional modules and other components typically found in conventional implementations of storage controllers and storage systems, although such additional modules and other components are omitted from the figure for clarity and simplicity of illustration.

For example, the storage controllers 108 can comprise or be otherwise associated with one or more write caches and one or more write cache journals, both also illustratively distributed across the storage nodes 105 of the distributed storage system. It is further assumed in illustrative embodiments that one or more additional journals are provided in the distributed storage system, such as, for example, a metadata update journal and possibly other journals providing other types of journaling functionality for IO operations. Illustrative embodiments disclosed herein are assumed to be configured to perform various destaging processes for write caches and associated journals, and to perform additional or alternative functions in conjunction with processing of IO operations.

The storage devices 106 of the storage nodes 105 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices. Such storage devices are examples of local persistent storage devices 106 of the storage nodes 105 of the distributed storage system of FIG. 1.

In some embodiments, the storage nodes 105 of the distributed storage system collectively provide a scale-out storage system, although the storage nodes 105 can be used to implement other types of storage systems in other embodiments. One or more such storage nodes can be associated with at least one storage array. Additional or alternative types of storage products that can be used in implementing a given storage system in illustrative embodiments include software-defined storage, cloud storage and object-based storage. Combinations of multiple ones of these and other storage types can also be used.

As indicated above, the storage nodes 105 in some embodiments comprise respective software-defined storage server nodes of a software-defined storage system, in which the number and types of storage nodes 105 can be dynamically expanded or contracted under software control using software-defined storage techniques.

The term "storage system" as used herein is therefore intended to be broadly construed, and should not be viewed as being limited to certain types of storage systems, such as content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

In some embodiments, communications between the host devices 101 and the storage nodes 105 comprise NVMe commands of an NVMe storage access protocol, for example, as described in the NVMe Specification, Revision 2.0a, July 2021, which is incorporated by reference herein. Other examples of NVMe storage access protocols that may be utilized in illustrative embodiments disclosed herein include NVMe over Fabrics, also referred to herein as NVMeF, and NVMe over TCP, also referred to herein as NVMe/TCP. Other embodiments can utilize other types of storage access protocols. As another example, communications between the host devices 101 and the storage nodes 105 in some embodiments can comprise Small Computer System Interface (SCSI) or Internet SCSI (iSCSI) commands.

Other types of commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other types, formats and configurations of IO operations can be used in other embodiments, as that term is broadly used herein.

Some embodiments disclosed herein are configured to utilize one or more RAID arrangements to store data across the storage devices 106 in each of one or more of the storage nodes 105 of the distributed storage system 102.

The RAID arrangement can comprise, for example, a RAID 5 arrangement supporting recovery from a failure of a single one of the plurality of storage devices, a RAID 6 arrangement supporting recovery from simultaneous failure of up to two of the storage devices, or another type of RAID arrangement. For example, some embodiments can utilize RAID arrangements with redundancy higher than two.

The term "RAID arrangement" as used herein is intended to be broadly construed, and should not be viewed as limited to RAID 5, RAID 6 or other parity RAID arrangements. For example, a RAID arrangement in some embodiments can comprise combinations of multiple instances of distinct RAID approaches, such as a mixture of multiple distinct RAID types (e.g., RAID 1 and RAID 6) over the same set of storage devices, or a mixture of multiple stripe sets of different instances of one RAID type (e.g., two separate instances of RAID 5) over the same set of storage devices. Other types of parity RAID techniques and/or non-parity RAID techniques can be used in other embodiments.

Such a RAID arrangement is illustratively established by the storage controllers 108 of the respective storage nodes 105. The storage devices 106 in the context of RAID arrangements herein are also referred to as "disks" or "drives." A given such RAID arrangement may also be referred to in some embodiments herein as a "RAID array."

The RAID arrangement used in an illustrative embodiment includes a plurality of "disks," each a different physical storage device of the storage devices 106. Multiple such physical storage devices are typically utilized to store data of a given LUN or other logical storage volume in the distributed storage system. For example, data pages or other data blocks of a given LUN or other logical storage volume can be "striped" along with its corresponding parity information across multiple ones of the disks in the RAID arrangement in accordance with RAID 5 or RAID 6 techniques.

A given RAID 5 arrangement defines block-level striping with single distributed parity and provides fault tolerance of a single drive failure, so that the array continues to operate with a single failed drive, irrespective of which drive fails. For example, in a conventional RAID 5 arrangement, each stripe includes multiple data blocks as well as a corresponding p parity block. The p parity blocks are associated with respective row parity information computed using well-known RAID 5 techniques. The data and parity blocks are distributed over the disks to support the above-noted single distributed parity and its associated fault tolerance.

A given RAID 6 arrangement defines block-level striping with double distributed parity and provides fault tolerance of up to two drive failures, so that the array continues to operate with up to two failed drives, irrespective of which two drives fail. For example, in a conventional RAID 6 arrangement, each stripe includes multiple data blocks as well as corresponding p and q parity blocks. The p and q parity blocks are associated with respective row parity information and diagonal parity information computed using well-known RAID 6 techniques. The data and parity blocks are distributed over the disks to collectively provide a diagonal-based configuration for the p and q parity information, so as to support the above-noted double distributed parity and its associated fault tolerance.

In such RAID arrangements, the parity blocks are typically not read unless needed for a rebuild process triggered by one or more storage device failures.

These and other references herein to RAID 5, RAID 6 and other particular RAID arrangements are only examples, and numerous other RAID arrangements can be used in other embodiments. Also, other embodiments can store data across the storage devices 106 of the storage nodes 105 without using RAID arrangements.

In some embodiments, the storage nodes 105 of the distributed storage system of FIG. 1 are connected to each other in a full mesh network, and are collectively managed by a system manager. A given set of local persistent storage devices 106 on a given one of the storage nodes 105 is illustratively implemented in a disk array enclosure (DAE) or other type of storage array enclosure of that storage node. Each of the storage nodes 105 illustratively comprises a CPU or other type of processor, a memory, a network interface card (NIC) or other type of network interface, and its corresponding storage devices 106, possibly arranged as part of a DAE of the storage node.

In some embodiments, different ones of the storage nodes 105 are associated with the same DAE or other type of storage array enclosure. The system manager is illustratively implemented as a management module or other similar management logic instance, possibly running on one or more of the storage nodes 105, on another storage node and/or on a separate non-storage node of the distributed storage system.

As a more particular non-limiting illustration, the storage nodes 105 in some embodiments are paired together in an arrangement referred to as a "brick," with each such brick being coupled to a different DAE comprising multiple drives, and each node in a brick being connected to the DAE and to each drive through a separate connection. The system manager may be running on one of the two nodes of a first one of the bricks of the distributed storage system. Again, numerous other arrangements of the storage nodes are possible in a given distributed storage system as disclosed herein.

The system 100 as shown further comprises a plurality of system management nodes 110 that are illustratively configured to provide system management functionality of the type noted above. Such functionality in the present embodiment illustratively further involves utilization of control plane servers 112 and a system management database 116. In some embodiments, at least portions of the system management nodes 110 and their associated control plane servers 112 are distributed over the storage nodes 105. For example, a designated subset of the storage nodes 105 can each be configured to include a corresponding one of the control plane servers 112. Other system management functionality provided by system management nodes 110 can be similarly distributed over a subset of the storage nodes 105.

The system management database 116 stores configuration and operation information of the system 100 and portions thereof are illustratively accessible to various system administrators such as host administrators and storage administrators.

The host devices 101-1, 101-2, . . . 101-N include respective instances of path selection logic 114-1, 114-2, . . . 114-N. Such instances of path selection logic 114 are illustratively utilized in supporting multiple distinct SLOs for different storage pools of the distributed storage system 102, possibly through utilization of associated IO throttling logic that responds to backpressure information or other types of feedback information received from the distributed storage system 102, as described in more detail below. The term "service level objective" or SLO as used herein is intended to be broadly construed, so as to encompass, for example, various types of quality of service (QoS), class of service (CoS) or other levels of system performance in processing IO operations. These and other SLOs referred to herein can be based, for example, at least in part on one or more designated system performance measures, such as latency, throughput and/or other metrics.

In some embodiments, each of the storage nodes 105 of the distributed storage system 102 is assumed to comprise multiple target controllers associated with a corresponding target of that storage node. Such a "target" as that term is broadly used herein is illustratively a destination end of one or more paths from one or more of the host devices 101 to the storage node, and may comprise, for example, an NVMe subsystem of the storage node, although other types of targets can be used in other embodiments. The paths that are selected by instances of path selection logic 114 of the host devices 101 for delivering IO operations from the host devices 101 to the distributed storage system 102 are associated with respective initiator-target pairs, as described in more detail elsewhere herein.

In some embodiments, IO operations are processed in the host devices 101 utilizing their respective instances of path selection logic 114 in the following manner. A given one of the host devices 101 establishes a plurality of paths between at least one initiator of the given host device and a plurality of targets of respective storage nodes 105 of the distributed storage system 102. For each of a plurality of IO operations generated in the given host device for delivery to the distributed storage system 102, the host device selects a path to a particular target, and sends the IO operation to the corresponding storage node over the selected path.

The given host device above is an example of what is more generally referred to herein as "at least one processing device" that includes a processor coupled to a memory. The storage nodes 105 of the distributed storage system 102 are also examples of "at least one processing device" as that term is broadly used herein.

It is to be appreciated that path selection as disclosed herein can be performed independently by each of the host devices 101, illustratively utilizing their respective instances of path selection logic 114, as indicated above, with possible involvement of additional or alternative system components.

In some embodiments, the initiator of the given host device and the targets of the respective storage nodes 105 are configured to support a designated standard storage access protocol, such as an NVMe access protocol or a SCSI access protocol. As more particular examples in the NVMe context, the designated storage access protocol may comprise an NVMeF or NVMe/TCP access protocol, although a wide variety of additional or alternative storage access protocols can be used in other embodiments.

The host devices 101 can comprise additional or alternative components. For example, in some embodiments, the host devices 101 further comprise respective sets of IO queues and respective multi-path input-output (MPIO) drivers. The MPIO drivers collectively comprise a multi-path layer of the host devices 101. Path selection functionality for delivery of IO operations from the host devices 101 to the distributed storage system 102 is provided in the multi-path layer by respective instances of path selection logic implemented within the MPIO drivers. In some embodiments, the instances of path selection logic 114 are implemented at least in part within the MPIO drivers of the host devices 101.

The MPIO drivers may comprise, for example, otherwise conventional MPIO drivers, such as PowerPath® drivers from Dell Technologies, suitably modified in the manner disclosed herein to provide functionality for multiple target controllers supporting different SLOs. Other types of MPIO drivers from other driver vendors may be suitably modified to incorporate functionality for multiple target controllers supporting different SLOs as disclosed herein.

For example, the instances of path selection logic 114 of the respective host devices 101 can be implemented at least in part in respective MPIO drivers of those host devices.

In some embodiments, such instances of path selection logic 114 include or are otherwise associated with IO throttling logic that is configured to throttle certain IO operations based at least in part on backpressure information provided by the storage nodes 105 of the distributed storage system 102.

Such IO throttling logic can be part of an MPIO layer of the host devices 101, or can be implemented elsewhere within the host devices 101.

In some embodiments, the host devices 101 comprise respective local caches, implemented using respective memories of those host devices. A given such local cache can be implemented using one or more cache cards. A wide variety of different caching techniques can be used in other embodiments, as will be appreciated by those skilled in the art. Other examples of memories of the respective host devices 101 that may be utilized to provide local caches include one or more memory cards or other memory devices, such as, for example, an NVMe over PCIe cache card, a local flash drive or other type of NVM storage drive, or combinations of these and other host memory devices.

The MPIO drivers are illustratively configured to deliver IO operations selected from their respective sets of IO queues to the distributed storage system 102 via selected ones of multiple paths over the network 104. The sources of the IO operations stored in the sets of IO queues illustratively include respective processes of one or more applications executing on the host devices 101. For example, IO operations can be generated by each of multiple processes of a database application running on one or more of the host devices 101. Such processes issue IO operations for delivery to the distributed storage system 102 over the network 104. Other types of sources of IO operations may be present in a given implementation of system 100.

A given IO operation is therefore illustratively generated by a process of an application running on a given one of the host devices 101, and is queued in one of the IO queues of the given host device with other operations generated by other processes of that application, and possibly other processes of other applications.

The paths from the given host device to the distributed storage system 102 illustratively comprise paths associated with respective initiator-target pairs, with each initiator comprising a host bus adaptor (HBA) or other initiating entity of the given host device and each target comprising a port or other targeted entity corresponding to one or more of the storage devices 106 of the distributed storage system 102. As noted above, the storage devices 106 illustratively comprise LUNs or other types of logical storage devices.

In some embodiments, the paths are associated with respective communication links between the given host device and the distributed storage system 102 with each such communication link having a negotiated link speed. For example, in conjunction with registration of a given HBA to a switch of the network 104, the HBA and the switch may negotiate a link speed. The actual link speed that can be achieved in practice in some cases is less than the negotiated link speed, which is a theoretical maximum value.

Negotiated rates of the respective particular initiator and the corresponding target illustratively comprise respective negotiated data rates determined by execution of at least one link negotiation protocol for an associated one of the paths.

In some embodiments, at least a portion of the initiators comprise virtual initiators, such as, for example, respective ones of a plurality of N-Port ID Virtualization (NPIV) initiators associated with one or more Fibre Channel (FC) network connections. Such initiators illustratively utilize NVMe arrangements such as NVMe/FC, although other protocols can be used. Other embodiments can utilize other types of virtual initiators in which multiple network addresses can be supported by a single network interface, such as, for example, multiple media access control (MAC) addresses on a single network interface of an Ethernet network interface card (NIC). Accordingly, in some embodiments, the multiple virtual initiators are identified by respective ones of a plurality of media MAC addresses of a single network interface of a NIC. Such initiators illustratively utilize NVMe arrangements such as NVMe/TCP, although again other protocols can be used.

Accordingly, in some embodiments, multiple virtual initiators are associated with a single HBA of a given one of the host devices 101 but have respective unique identifiers associated therewith.

Additionally or alternatively, different ones of the multiple virtual initiators are illustratively associated with respective different ones of a plurality of virtual machines of the given host device that share a single HBA of the given host device, or a plurality of logical partitions of the given host device that share a single HBA of the given host device.

Numerous alternative virtual initiator arrangements are possible, as will be apparent to those skilled in the art. The term "virtual initiator" as used herein is therefore intended to be broadly construed. It is also to be appreciated that other embodiments need not utilize any virtual initiators. References herein to the term "initiators" are intended to be broadly construed, and should therefore be understood to encompass physical initiators, virtual initiators, or combinations of both physical and virtual initiators.

Various scheduling algorithms, load balancing algorithms and/or other types of algorithms can be utilized by the MPIO driver of the given host device in delivering IO operations from the IO queues of that host device to the distributed storage system 102 over particular paths via the network 104. Each such IO operation is assumed to comprise one or more commands for instructing the distributed storage system 102 to perform particular types of storage-related functions such as reading data from or writing data to particular logical volumes of the distributed storage system 102. Such commands are assumed to have various payload sizes associated therewith, and the payload associated with a given command is referred to herein as its "command payload."

A command directed by the given host device to the distributed storage system 102 is considered an "outstanding" command until such time as its execution is completed in the viewpoint of the given host device, at which time it is considered a "completed" command. The commands illustratively comprise respective NVMe or SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the given host device and that the targets of the plurality of initiator-target pairs comprise respective ports of the distributed storage system 102. Examples of such HBAs and storage array ports are illustrated in conjunction with the embodiment of FIG. 5. A wide variety of other types and arrangements of initiators and targets can be used in other embodiments.

Selecting a particular one of multiple available paths for delivery of a selected one of the IO operations from the given host device is more generally referred to herein as "path selection." Path selection as that term is broadly used herein can in some cases involve both selection of a particular IO operation and selection of one of multiple possible paths for accessing a corresponding logical device of the distributed storage system 102. The corresponding logical device illustratively comprises a LUN or other logical storage volume to which the particular IO operation is directed.

It should be noted that paths may be added or deleted between the host devices 101 and the distributed storage system 102 in the system 100. For example, the addition of one or more new paths from the given host device to the distributed storage system 102 or the deletion of one or more existing paths from the given host device to the distributed storage system 102 may result from respective addition or deletion of at least a portion of the storage devices 106 of the distributed storage system 102.

Addition or deletion of paths can also occur as a result of zoning and masking changes or other types of storage system reconfigurations performed by a storage administrator or other user. Some embodiments are configured to send a predetermined command from the given host device to the distributed storage system 102, illustratively utilizing the MPIO driver, to determine if zoning and masking information has been changed. The predetermined command can comprise, for example, a log sense command, a mode sense command, a "vendor unique command" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the distributed storage system 102 as well to discover the disappearance of any existing LUNs that have been deleted from the distributed storage system 102.

The MPIO driver of the given host device in some embodiments comprises a user-space portion and a kernel-space portion. The kernel-space portion of the MPIO driver may be configured to detect one or more path changes of the type mentioned above, and to instruct the user-space portion of the MPIO driver to run a path discovery scan responsive to the detected path changes. Other divisions of functionality between the user-space portion and the kernel-space portion of the MPIO driver are possible. The user-space portion of the MPIO driver is illustratively associated with an Operating System (OS) kernel of the given host device.

For each of one or more new paths identified in the path discovery scan, the given host device may be configured to execute a host registration operation for that path. The host registration operation for a given new path illustratively provides notification to the distributed storage system 102 that the given host device has discovered the new path.

As indicated previously, the storage nodes 105 of the distributed storage system 102 process IO operations from one or more host devices 101 and in processing those IO operations run various storage application processes that generally involve interaction of that storage node with one or more other ones of the storage nodes.

In the FIG. 1 embodiment, the distributed storage system 102 comprises storage controllers 108 and corresponding sets of storage devices 106, and may include additional or alternative components, such as sets of local caches.

The storage controllers 108 illustratively control the processing of IO operations received in the distributed storage system 102 from the host devices 101. For example, the storage controllers 108 illustratively manage the processing of read and write commands directed by the MPIO drivers of the host devices 101 to particular ones of the storage devices 106. The storage controllers 108 can be implemented as respective storage processors, directors or other storage system components configured to control storage system operations relating to processing of IO operations. In some embodiments, each of the storage controllers 108 has a different one of the above-noted local caches associated therewith, although numerous alternative arrangements are possible.

The manner in which multiple target controller functionality is implemented in system 100 will now be described in more detail.

As indicated previously, in software-defined storage system arrangements utilizing advanced storage access protocols such as NVMeF or NVMe/TCP, it can be difficult to implement different levels of service for respective different applications. Similar issues arise in other types of storage systems.

Illustrative embodiments disclosed herein provide techniques for utilizing multiple target controllers to support different SLOs in a software-defined storage system or other type of distributed storage system. Such techniques advantageously facilitate the usage of advanced storage access protocols such as NVMeF or NVMe/TCP while avoiding the above-described drawbacks of conventional practice. For example, some embodiments can easily implement different SLOs for respective different applications or different application processes running on one or more host devices.

Such embodiments can provide significant advantages, such as, for example, guaranteeing particular performance levels for critical applications that require high throughput and low latency, despite the limited storage resources of a given storage system implementation. These embodiments can additionally or alternatively ensure that particular applications are not receiving levels of performance that are significantly higher or lower than those specified in their service level agreements.

As mentioned above, each of the storage nodes 105 of the distributed storage system 102 illustratively comprises one or more targets, where each such target is associated with multiple distinct paths from respective HBAs or other initiators of one or more of the host devices 101. Illustrative embodiments disclosed herein configure a given such target to include multiple target controllers supporting different SLOs.

For example, in some embodiments, one or more of the storage nodes 105 each implements at least one target, such as an NVMe target, that is configured to include multiple target controllers, such as at least a first target controller associated with a first storage pool having a first SLO, and a second target controller associated with a second storage pool and having a second SLO different than the first SLO. The first and second storage pools are illustratively storage pools of the distributed storage system 102, and such storage pools may be distributed across multiple ones of the storage nodes 105. Each of the first and second storage pools is assumed to comprise one or more LUNs or other logical storage volumes.

Although first and second target controllers are referred to in conjunction with some embodiments herein, it is to be appreciated that more than two target controllers can be implemented in a given target in order to support more than two distinct SLOs for respective ones of more than two storage pools.

A given one of the storage nodes 105 illustratively processes IO operations received from one or more of the host devices 101, with different ones of the IO operations being directed by the one or more host devices 101 from one or more initiators of the one or more host devices 101 to different ones of the first and second target controllers of the target implemented within the given storage node.

The given storage node provides separate feedback information to the one or more host devices 101 for respective ones of the first and second target controllers, so as to permit different amounts of throttling of additional IO operations in the one or more host devices 101 based at least in part on whether those additional IO operations are to be directed to the first target controller or the second target controller.

The other storage nodes 105 are each assumed to be configured in a manner similar to that described above and elsewhere herein for the given storage node.

In some embodiments, providing separate feedback information from the given storage node to the one or more host devices 101 for respective ones of the first and second target controllers comprises providing from the storage node to at least one of the one or more host devices 101 a first IO pressure indicator of a first type responsive to detection of an IO pressure condition relating to the first target controller, and providing from the storage node to at least one of the one or more host devices 101 a second IO pressure indicator of a second type different than the first type responsive to detection of an IO pressure condition relating to the second target controller.

Such an arrangement advantageously allows the one or more host devices 101 to provide different amounts of IO throttling for IO operations that are directed to the first target controller relative to those that are directed to the second target controller, thereby facilitating the provision of the distinct SLOs for the first and second storage pools. The IO throttling performed within a given one of the host devices 101 can be implemented using a conventional "leaky bucket" algorithm or other known IO throttling techniques that limit the rate at which particular IO operations are delivered to the distributed storage system 102. These can additionally or alternatively include various types of different IO queuing arrangements for IO operations from different applications or processes.

In some embodiments, the first and second target controllers are part of a single physical controller subsystem of the given storage node. For example, the first and second target controllers may comprise respective NVMe target controllers of an NVMe subsystem of the given storage node. Such an NVMe subsystem is considered an example of what is more generally referred to herein as a "target" of the given storage node.

An example of such an arrangement will be described in more detail below in conjunction with FIG. 4. Other types of targets comprising multiple target controllers supporting different SLOs can be used in other embodiments.

The first and second target controllers in some embodiments may be viewed as comprising respective "virtual" target controllers associated with the single physical controller subsystem of the given storage node.

Additionally or alternatively, the first and second target controllers in some embodiments are accessible via respective first and second different TCP associations between a given one of the one or more host devices 101 and the given storage node. In such an arrangement, a host device accesses the first target controller using the first TCP association, and accesses the second target controller using the second TCP association. Other types of communication links can be used in other embodiments.

In some embodiments, the first target controller comprises a first set of IO queues and the second target controller comprises a second set of IO queues, with the second set of IO queues having at least one of a different number of IO queues and a different IO queue size than the first set of IO queues. At least one of the number of IO queues and the IO queue size for each of the first and second target controllers is determined based at least in part on their respective first and second SLOs. Additional or alternative adjustments can be made in the relative configurations of the first and second target controllers in order to facilitate the provision of the distinct SLOs for their respective storage pools.

As noted above, each of the storage pools comprises one or more LUNs or other logical storage volumes. One or more such logical storage volumes can be migrated from the first storage pool associated with the first target controller to the second storage pool associated with the second target controller. In some embodiments, a namespace update is executed for the first and second target controllers in conjunction with the migration of at least one logical storage volume from the first storage pool associated with the first target controller to the second storage pool associated with the second target controller.

The at least one logical storage volume migrated from the first storage pool to the second storage pool is illustratively accessible to the one or more host devices 101 through a different TCP association than that through which it was accessible to the one or more host devices 101 prior to its migration.

An additional example of an illustrative process for implementing at least some of the above-described multiple target controller functionality will be provided below in conjunction with the flow diagram of FIG. 2.

As indicated previously, the storage nodes 105 collectively comprise an example of a distributed storage system. The term "distributed storage system" as used herein is intended to be broadly construed, so as to encompass, for example, scale-out storage systems, clustered storage systems or other types of storage systems distributed over multiple storage nodes.

As another example, the storage nodes 105 in some embodiments are part of a distributed content addressable storage system in which logical addresses of data pages are mapped to physical addresses of the data pages in the storage devices 106 using respective hash digests, hash handles or other content-based signatures that are generated from those data pages using a secure hashing algorithm. A wide variety of other types of distributed storage systems can be used in other embodiments.

Also, the term "storage volume" as used herein is intended to be broadly construed, and should not be viewed as being limited to any particular format or configuration.

In some embodiments, the storage nodes 105 are implemented using processing modules that are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of the storage nodes 105 illustratively comprise control modules, data modules, routing modules and at least one management module. Again, these and possibly other processing modules of the storage nodes 105 are illustratively interconnected with one another in the full mesh network, such that each of the modules can communicate with each of the other modules, although other types of networks and different module interconnection arrangements can be used in other embodiments.

The management module in such an embodiment may more particularly comprise a system-wide management module, also referred to herein as a system manager. Other embodiments can include multiple instances of the management module implemented on different ones of the storage nodes 105.

A wide variety of alternative configurations of nodes and processing modules are possible in other embodiments. Also, the term "storage node" as used herein is intended to be broadly construed, and may comprise a node that implements storage control functionality but does not necessarily incorporate storage devices. As mentioned previously, a given storage node can in some embodiments comprise a separate storage array, or a portion of a storage array that includes multiple such storage nodes.

Communication links may be established between the various processing modules of the storage nodes using well-known communication protocols such as TCP/IP and RDMA. For example, respective sets of IP links used in data transfer and corresponding messaging could be associated with respective different ones of the routing modules.

The particular features described above in conjunction with FIG. 1 should not be construed as limiting in any way, and a wide variety of other system arrangements utilizing multiple target controllers supporting different SLOs are possible.

The storage nodes 105 of the example distributed storage system 102 illustrated in FIG. 1 are assumed to be implemented using at least one processing platform, with each such processing platform comprising one or more processing devices, and each such processing device comprising a processor coupled to a memory. Such processing devices can illustratively include particular arrangements of compute, storage and network resources.

The storage nodes 105 may be implemented on respective distinct processing platforms, although numerous other arrangements are possible. At least portions of their associated host devices 101 may be implemented on the same processing platforms as the storage nodes 105 or on separate processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different subsets of the host devices 101 and the storage nodes 105 to reside in different data centers. Numerous other distributed implementations of the storage nodes 105 and their respective associated sets of host devices 101 are possible.

Additional examples of processing platforms utilized to implement storage systems and possibly their associated host devices in illustrative embodiments will be described in more detail below in conjunction with FIGS. 6 and 7.

It is to be appreciated that these and other features of illustrative embodiments are presented by way of example only, and should not be construed as limiting in any way.

Accordingly, different numbers, types and arrangements of system components such as host devices 101, distributed storage system 102, storage nodes 105, storage devices 106, storage controllers 108, system management nodes 110 and instances of path selection logic 114 can be used in other embodiments. For example, as mentioned previously, system management functionality of system management nodes 110 can be distributed across a subset of the storage nodes 105, instead of being implemented on separate nodes.

It should be understood that the particular sets of modules and other components implemented in a distributed storage system as illustrated in FIG. 1 are presented by way of example only. In other embodiments, only subsets of these components, or additional or alternative sets of components, may be used, and such components may exhibit alternative functionality and configurations.

For example, in other embodiments, certain portions of multiple target controller functionality as disclosed herein can be implemented in one or more host devices, in a storage system, or partially in a host device and partially in a storage system. Accordingly, illustrative embodiments are not limited to arrangements in which multiple target controller functionality is implemented primarily in storage system or primarily in a particular host device or set of host devices, and therefore such embodiments encompass various alternative arrangements, such as, for example, an arrangement in which the functionality is distributed over one or more storage systems and one or more associated host devices, each comprising one or more processing devices. The term "at least one processing device" as used herein is therefore intended to be broadly construed.

The operation of the information processing system 100 will now be described in further detail with reference to the flow diagram of the illustrative embodiment of FIG. 2, which illustrates a process for implementing multiple target controllers supporting different SLOs as disclosed herein. This process may be viewed as an example algorithm implemented at least in part by distributed storage system 102 interacting with one or more of the host devices 101. These and other algorithms for supporting different SLOs using respective distinct target controllers as disclosed herein can be implemented using other types and arrangements of system components in other embodiments.

Figure 2:
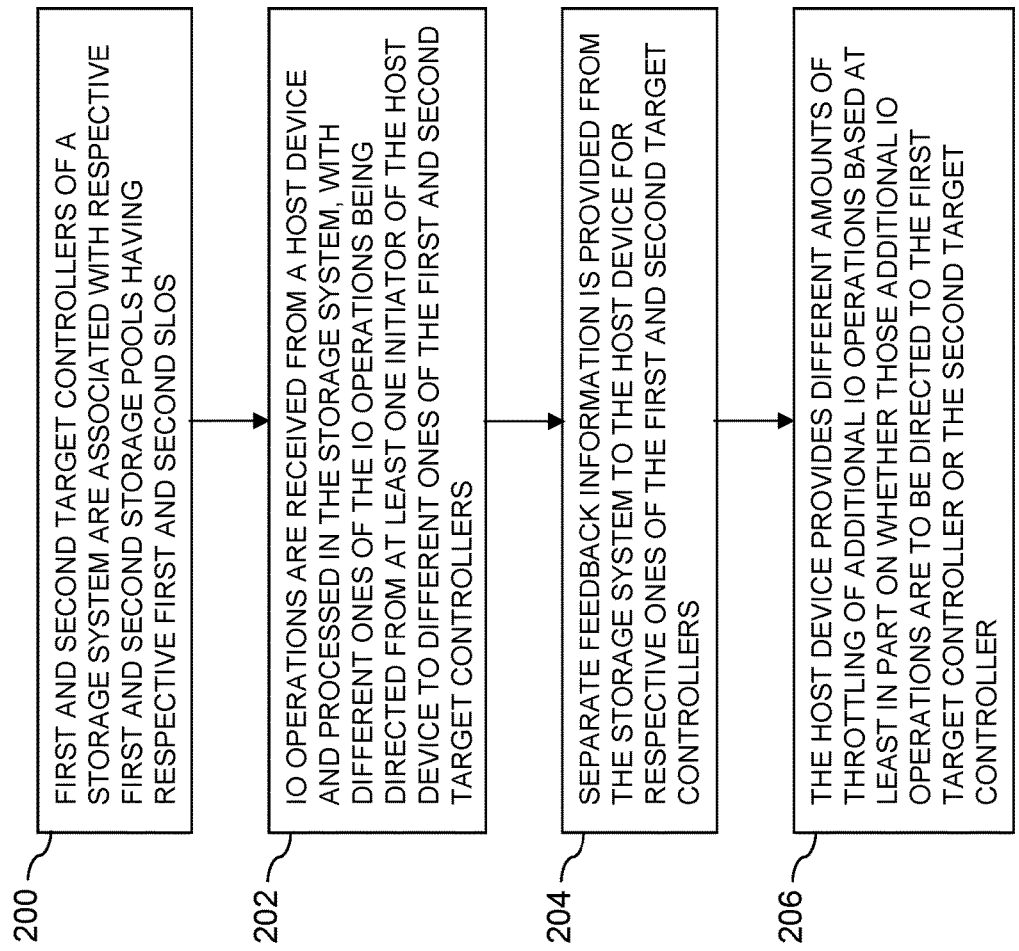
FIG. 2 is a flow diagram of a process for multiple target controllers supporting different SLOs in a distributed storage system in an illustrative embodiment.

The multiple target controller process illustrated in FIG. 2 includes steps 200 through 206, and is assumed to be implemented primarily by the distributed storage system 102 interacting with a given one of the host devices 101 utilizing its instance of path selection logic 114. Similar processes may be implemented primarily by each of the other ones of the host devices 101 utilizing their respective instances of path selection logic 114.

As mentioned previously, the instances of path selection logic 114 may be configured to include or to be otherwise associated with respective corresponding instances of IO throttling logic, for controlling rates at which IO operations are sent to different target controllers based at least in part on backpressure information provided by one or more of the storage nodes 105 of the distributed storage system 102. Such backpressure information, which may comprise, for example, various types of indicators of IO pressure conditions detected in the distributed storage system 102, is itself an example of what is more generally referred to herein as "feedback information."

In step 200, first and second target controllers of a storage system are associated with respective first and second storage pools having respective first and second SLOs. Although only first and second target controllers are referred to in some embodiments herein, other embodiments can include more than two target controllers associated with respective storage pools having respective SLOs. For example, there can be first, second and third target controllers associated with respective first, second and third storage pools having respective first, second and third SLOs, and so on for more than three target controllers supporting respective ones of more than three SLOs.

An example of multiple target controllers of a single physical NVMe subsystem of the storage system will be described in more detail below in conjunction with the illustrative embodiment of FIG. 4.

In step 202, IO operations are received from a host device and processed in the storage system, with different ones of the IO operations being directed from at least one initiator of the host device to different ones of the first and second target controllers.

For example, in some embodiments, a plurality of paths are established between at least one initiator of the host device and a plurality of targets of respective storage nodes of a distributed storage system. In some embodiments, the paths are established at least in part utilizing one or more MPIO drivers of the host device, although it is to be appreciated that use of MPIO drivers or a multi-path layer is not a requirement of the present disclosure. There are illustratively multiple paths between each initiator and each of one or more of the targets. A given such target can comprise, for example, an NVMe subsystem, which is more generally referred to herein as an NVMe target. The NVMe subsystem or other NVMe target in such an arrangement illustratively comprises at least the first and second target controllers supporting at least the first and second SLOs.

The IO operations are illustratively generated by processes of one or more applications executing on the host device for delivery to the storage system. As indicated previously, in some embodiments the storage system comprises a distributed storage system with multiple storage nodes, and may more particularly comprise a software-defined storage system in which the storage nodes comprise respective software-defined storage server nodes, each having one or more NVMe targets or other types of targets implemented therein. Other distributed or non-distributed storage systems can be used in other embodiments. The delivery of IO operations from the host device to the storage system is illustratively controlled by path selection logic of one or more MPIO drivers of the host device.

For example, the path selection logic is illustratively configured, for each of the IO operations, to select a particular one of the paths from one of the initiators of the host device to one of the targets of the storage system, such as a particular NVMe target. Such selection in some embodiments makes use of path selection logic of one or more MPIO drivers of the host device, although again it is to be understood that use of MPIO drivers is not required. The IO operation is sent to the storage system over the selected path from an initiator of the host device to a target of the storage system.

The IO operations illustratively comprise read and/or write operations that access data of one or more LUNs or other logical storage volumes of the storage system. Each of the first and second storage pools is assumed to comprise one or more such logical storage volumes, and logical storage volumes can be migrated between the storage pools in the manner described elsewhere herein.

In step 204, separate feedback information is provided from the storage system to the host device for respective ones of the first and second target controllers.

In step 206, the host device provides different amounts of throttling of additional IO operations based at least in part on whether those additional IO operations are to be directed to the first target controller or the second target controller.

Steps 202 through 206 are illustratively repeated over time in order to support the different SLOs for the first and second target controllers. Multiple such processes may operate in parallel with one another in order to process IO operations generated by respective different sets of applications or portions thereof.

The steps of the FIG. 2 process are shown in sequential order for clarity and simplicity of illustration only, and certain steps can at least partially overlap with other steps. Additional or alternative steps can be used in other embodiments.

The particular processing operations and other system functionality described in conjunction with the flow diagram of FIG. 2 are therefore presented by way of illustrative example only, and should not be construed as limiting the scope of the disclosure in any way. Alternative embodiments can use other types of processing operations for implementing multiple target controllers supporting different SLOs for one or more host devices and a storage system. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different processes for respective different host devices, logical storage volumes and applications executing on the one or more host devices.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Host devices can be implemented as part of what is more generally referred to herein as a processing platform comprising one or more processing devices each comprising a processor coupled to a memory.

A given such processing device in some embodiments may correspond to one or more virtual machines or other types of virtualization infrastructure such as Docker containers or Linux containers (LXCs). Host devices, storage controllers and other system components may be implemented at least in part using processing devices of such processing platforms. For example, respective path selection logic instances and other related logic instances of the host devices can be implemented in respective containers running on respective ones of the processing devices of a processing platform.

Additional examples of illustrative embodiments will now be described with reference to FIGS. 3 through 5.

Figure 3:
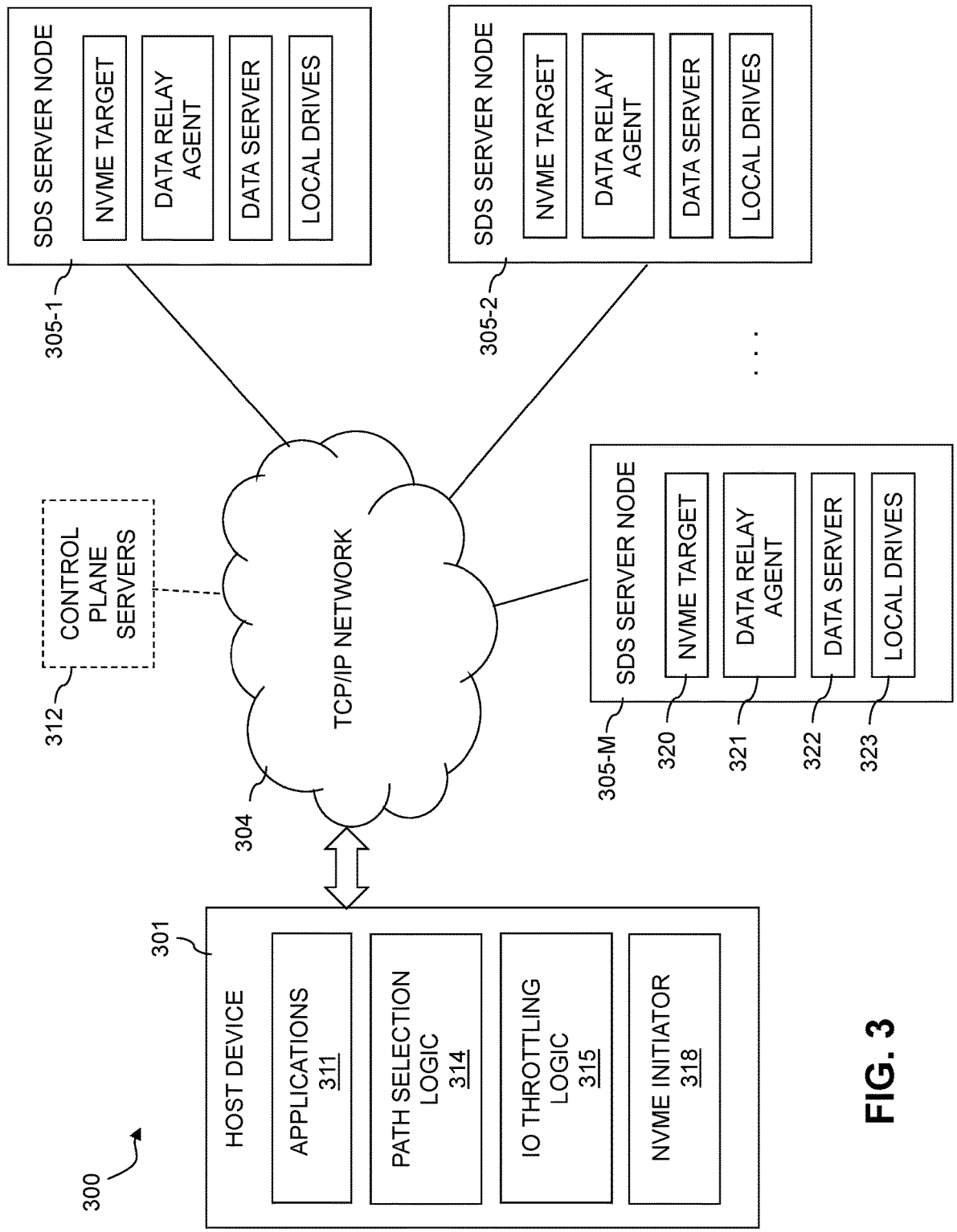
FIG. 3 shows another example of an information processing system incorporating functionality for multiple target controllers supporting different SLOs in a software-defined storage system in an illustrative embodiment.

Referring initially to FIG. 3, this embodiment illustrates an example of a distributed storage system that more particularly comprises a software-defined storage system having a plurality of software-defined storage server nodes, also referred to as SDS server nodes, configured to utilize an NVMe storage access protocol such as NVMeF or NVMe/TCP. Such SDS server nodes are examples of "storage nodes" as that term is broadly used herein. As will be appreciated by those skilled in the art, similar embodiments can be implemented without the use of software-defined storage and with other storage access protocols.

As shown in FIG. 3, an information processing system 300 comprises a host device 301 configured to communicate over a network 304, illustratively a TCP/IP network, with a software-defined storage system comprising a plurality of SDS server nodes 305-1, 305-2, . . . 305-M and corresponding control plane servers 312. The control plane servers 312 are shown in dashed outline as the functionality of such servers in illustrative embodiments is distributed over a particular subset of the SDS server nodes 305 rather than being implemented on separate nodes of the software-defined storage system. The control plane servers 312 provide system management functionality such as centralized storage provisioning, monitoring, membership management, as well as storage partitioning.

A plurality of applications 311 execute on the host device 301 and generate IO operations that are delivered to particular ones of the SDS server nodes 305 via at least one NVMe initiator 318. The host device 301 further comprises path selection logic 314 and IO throttling logic 315, illustratively configured to carry out aspects of multiple target controller functionality of the host device 301 in a manner similar to that previously described. In other embodiments, the IO throttling logic 315 may be part of the path selection logic 314, rather than a separate component as illustrated in the figure. Both the path selection logic 314 and the IO throttling logic 315 in some embodiments are implemented at least in part within an MPIO driver of the host device 301. Although only a single host device 301 is shown in system 300, the system 300 can include multiple host devices, each configured as generally shown for host device 301, as in the system 100 of FIG. 1.

Each of the SDS server nodes 305 in the present embodiment comprises at least one NVMe target 320, a data relay agent 321, a data server 322 and a set of local drives 323. The data relay agent 321 facilitates relaying of IO requests between different ones of the SDS server nodes 305, and the data servers 322 provide access to data stored in the local drives 323 of their respective SDS server nodes 305. Additional or alternative components may be included in the SDS server nodes 305 in illustrative embodiments.

Although single NVMe initiators and targets are shown in respective ones of the host device 301 and the SDS server nodes 305, this is by way of simplified illustration only, and other embodiments can include multiple NVMe initiators within host device 301 and multiple NVMe targets within each of the SDS server nodes 305.

In some embodiments, the SDS server nodes 305 are configured at least in part as respective PowerFlex® software-defined storage nodes from Dell Technologies, suitably modified as disclosed herein to include NVMe targets 320, although other types of storage nodes can be used in other embodiments.

Each of one or more of the NVMe targets 320 illustratively comprises an NVMe subsystem that implements multiple distinct target controllers supporting respective different SLOs. For example, a given such NVMe target can comprise at least a first target controller associated with a first storage pool of the distributed storage system and having a first SLO, and a second target controller associated with a second storage pool of the distributed storage system and having a second SLO different than the first SLO.

A given one of the SDS server nodes 305 processes IO operations received from the host device 301, with different ones of the IO operations being directed by the host device 301 from NVMe initiator 318 to different ones of the first and second target controllers of the NVMe target 320 of the given SDS server node.

The given SDS server node also provides separate feedback information to the host device 301 for respective ones of the first and second target controllers, so as to permit different amounts of throttling of additional IO operations to be applied via the IO throttling logic 315 based at least in part on whether those additional IO operations are to be directed to the first target controller or the second target controller. Such an arrangement facilitates the provisioning of the distinct first and second SLOs for the respective first and second storage pools.

Figure 4:
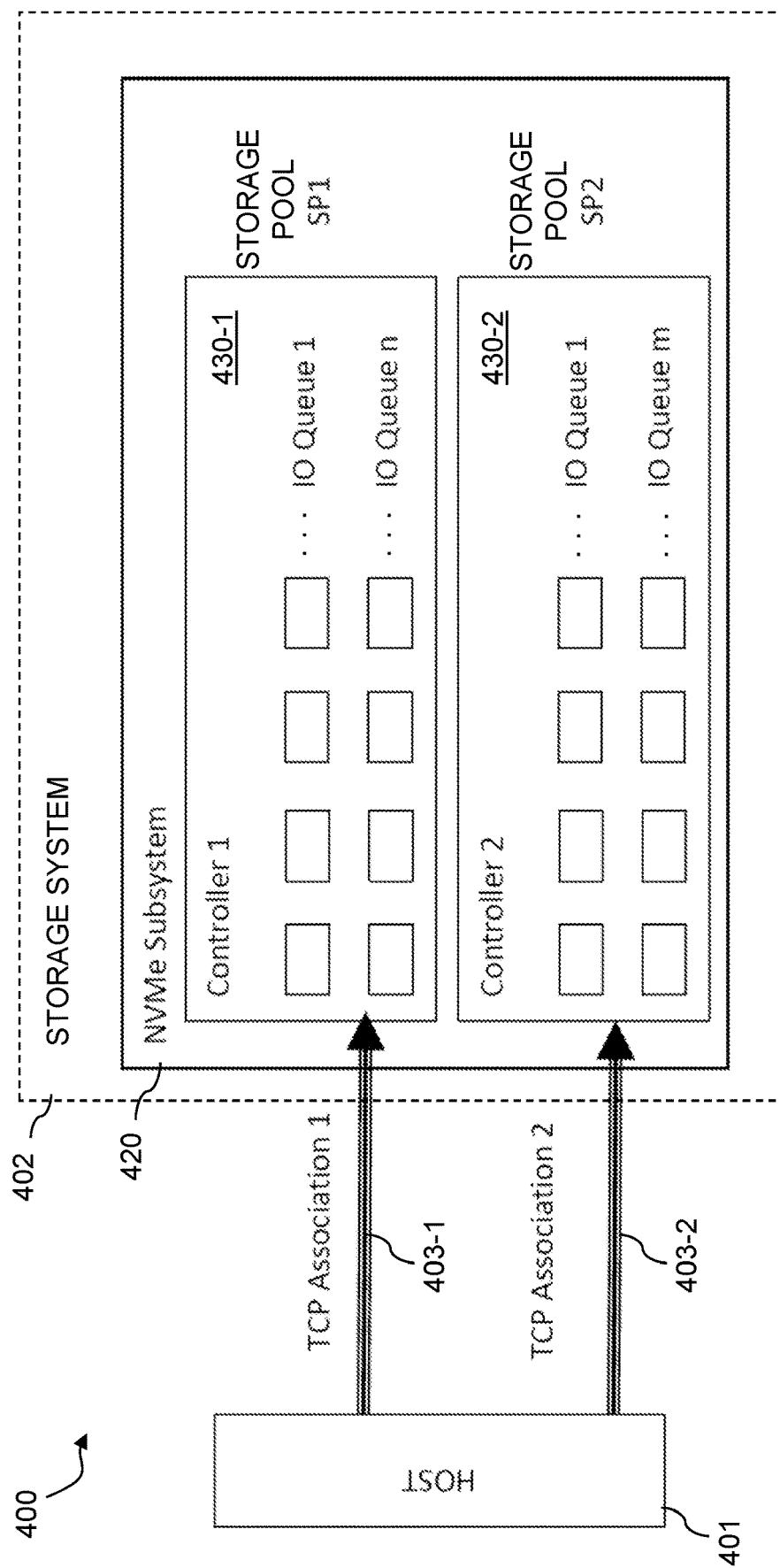
FIG. 4 illustrates an example association between different target controllers and respective storage pools with different SLOs in one embodiment.

FIG. 4 illustrates an example association between different target controllers and respective storage pools with different SLOs in one embodiment.

In the FIG. 4 embodiment, an information processing system 400 comprises a host device 401 that communicates with a storage system 402 via a plurality of TCP associations including at least a first TCP association 403-1 and a second TCP association 403-2, also denoted as TCP Association 1 and TCP Association 2, respectively. The storage system 402 may comprise, for example, a software-defined storage system or other type of distributed storage system, or a non-distributed storage system. Although only a single host device 401 is shown in the figure, the system 400 can include multiple host devices.

The storage system 402 comprises an NVMe subsystem 420. The NVMe subsystem 420 is an example of what is more generally referred to herein as a "target" of the storage system 402, and although only a single such target is shown in the figure, the storage system 402 can include multiple such targets, each illustratively implemented as a separate NVMe subsystem.

The NVMe subsystem 420 in this embodiment comprises a first target controller 430-1 and a second target controller 430-2, also denoted as Controller 1 and Controller 2, respectively. The first target controller 430-1 is associated with a first storage pool SP1 of the storage system 402 having a first SLO. The second target controller 430-2 is associated with a second storage pool SP2 of the storage system 402 having a second SLO different than the first SLO. In other embodiments, the NVMe subsystem 420 can comprise more than two target controllers 430, each associated with a different storage pool having a different SLO. The NVMe subsystem 420 is a single physical controller subsystem of the storage system 402, and the first and second target controllers 430-1 and 430-2 may be viewed as comprising respective virtual target controllers associated with that single physical controller subsystem, although numerous other arrangements are possible.

The storage system 402 processes IO operations received from the host device 401 via the TCP associations 403. The host device 401 directs IO operations from at least one NVMe initiator to the first target controller 430-1 via the first TCP association 403-1, and directs IO operations from the at least one NVMe initiator to the second target controller 430-2 via the second TCP association 403-2.

The storage system 402 provides separate feedback information to the host device 401 for respective ones of the first and second target controllers, so as to permit different amounts of throttling of additional IO operations in the host device 401 based at least in part on whether those additional IO operations are to be directed to the first target controller 430-1 or the second target controller 430-2.

For example, the storage system 402 can provide a first IO pressure indicator of a first type to the host device 401 responsive to detection of an IO pressure condition relating to the first target controller 430-1, and a second IO pressure indicator of a second type different than the first type responsive to detection of an IO pressure condition relating to the second target controller 430-2. Such IO pressure indicators are examples of "backpressure information" as that term is broadly used herein. Other types of feedback information can additionally or alternatively be provided by the storage system 402 to the host device 401 in other embodiments, in place of or in addition to backpressure information.

As illustrated in the figure, the first target controller 430-1 comprises a first set of IO queues denoted IO Queue 1 through IO Queue n, and the second target controller 430-2 comprises a second set of IO queues denoted IO Queue 1 through IO Queue m, where m may be greater than, equal to or less than n. The capacities of the first and second sets of IO queues of the first and second target controllers 430-1 and 430-2 are illustratively made different from one another by configuring those first and second sets of IO queues to have at least one of a different number of IO queues and a different IO queue size relative to one another, as determined based at least in part on their respective corresponding first and second SLOs. For example, if the first SLO is a higher service level than the second SLO, the number of IO queues n in the first target controller 430-1 may be made larger than the number of IO queues m in the second target controller 430-2.

Additionally or alternatively, the size of the IO queues in the first set of IO queues may be made larger than the size of the IO queues in the second set of IO queues. Other variations may be made to control the relative capacities and other functionality of the first and second target controllers 430-1 and 430-2 to support the respective first and second SLOs.

The above-noted IO pressure indicators of first and second types provided by the storage system 402 to the host device can illustratively comprise first and second queue fullness measures for the respective first and second sets of IO queues of the respective first and second target controllers 430-1 and 430-2. Other types of IO queue performance metrics or additional or alternative feedback information can be provided to allow the host device 401 to provide different types of IO throttling for IO operations directed to the first and second target controllers 430-1 and 430-2.

In the FIG. 4 embodiment, the NVMe target comprising NVMe subsystem 420 may be configured as a software-defined target or SDT of a software-defined storage system implementation of storage system 402. Such a target can be implemented at least in part as a Linux user space component, illustratively comprising a daemon listening for incoming TCP connections from one or more NVMe initiators of the host device 401. The NVMe target comprising NVMe subsystem 420 is accessible from the host device 401 via the TCP associations 403, each associated with a different one of the first and second target controllers 430-1 and 430-2 of the NVMe subsystem 420.

Figure 5:
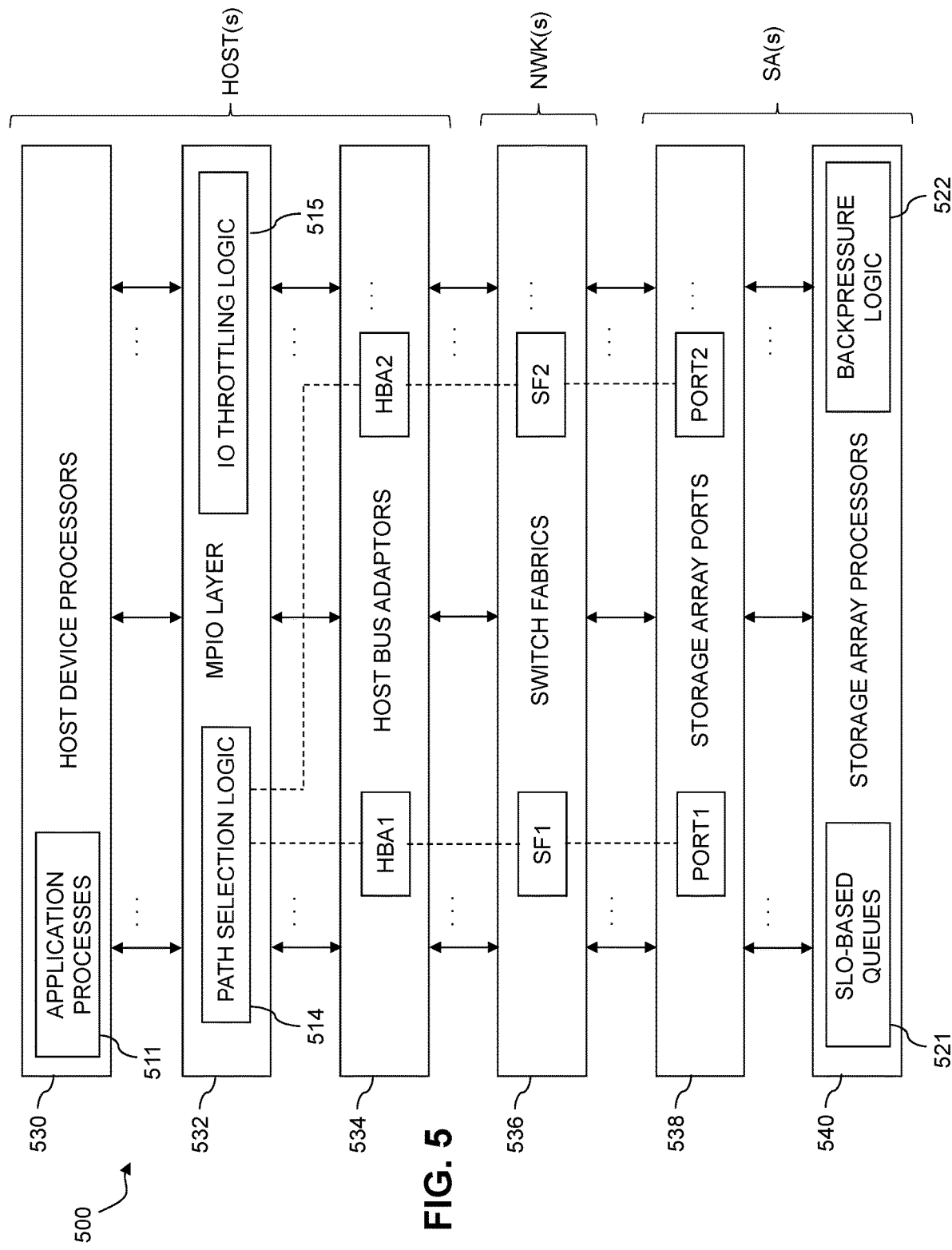
FIG. 5 shows a further example of an information processing system incorporating functionality for multiple target controllers supporting different SLOs in an illustrative embodiment.

Referring now to FIG. 5, another illustrative embodiment is shown. In this embodiment, an information processing system 500 comprises host-side elements that include application processes 511, path selection logic 514 and IO throttling logic 515, and storage-side elements that include SLO-based queues 521 and backpressure logic 522. The path selection logic 514 is configured to operate in conjunction with IO throttling logic 515, SLO-based queues 521 and backpressure logic 522 in accordance with multiple target controller functionality supporting different SLOs in the system 500. There may be separate instances of one or more such elements associated with each of a plurality of system components such as host devices and storage arrays of the system 500. For example, different instances of the path selection logic 514 are illustratively implemented within or otherwise in association with respective ones of a plurality of MPIO drivers of respective host devices.

The system 500 is configured in accordance with a layered system architecture that illustratively includes a host device processor layer 530, an MPIO layer 532, an HBA layer 534, a switch fabric layer 536, a storage array port layer 538 and a storage array processor layer 540. The host device processor layer 530, the MPIO layer 532 and the HBA layer 534 are associated with one or more host devices, the switch fabric layer 536 is associated with one or more SANs or other types of networks, and the storage array port layer 538 and storage array processor layer 540 are associated with one or more storage arrays ("SAs"). A given such storage array illustratively comprises a software-defined storage system or other type of distributed storage system comprising a plurality of storage nodes.

In a manner similar to that described elsewhere herein, one or more storage arrays of the system 500 are each configured to implement at least one storage-side target that includes at least a first target controller associated with a first storage pool of the storage system having a first SLO, and a second target controller associated with a second storage pool having a second SLO different than the first SLO.

The one or more storage arrays process IO operations received from one or more host devices, with different ones of the IO operations being directed by the one or more host devices under the control of path selection logic 514 and IO throttling logic 515 from one or more initiators of the one or more host devices to different ones of the first and second target controllers of the target in a given storage array.

The given storage array provides via its SLO-based queues 521 and backpressure logic 522 separate backpressure information to the one or more host devices for respective ones of the first and second target controllers, so as to permit the IO throttling logic 515 to provide different amounts of throttling of additional IO operations in the one or more host devices based at least in part on whether those additional IO operations are to be directed to the first target controller or the second target controller.

For example, in some embodiments, a given one of the host devices of the system 500 is illustratively configured to establish a plurality of paths between at least one initiator (e.g., an NVMe initiator) of the given host device and a plurality of targets (e.g., NVME targets) of respective storage nodes. For each of a plurality of IO operations generated by one or more of the application processes 511 in the given host device for delivery to the given storage array, to select, illustratively via path selection logic 514 of one or more MPIO drivers of the MPIO layer 532, a particular one of the plurality of paths from the initiator to one of the targets on the particular storage node, in accordance with SLO-based IO rate control functionality provided by the IO throttling logic 515, and to send the IO operation to the particular storage node over the selected path.

The system 500 in this embodiment therefore implements multiple target controller functionality utilizing one or more MPIO drivers of the MPIO layer 532, and associated instances of path selection logic 514, in accordance with SLO-based rate control functionality provided by one or more instances of the IO throttling logic 515, responsive to backpressure information received from the one or more storage arrays.

The application processes 511 generate IO operations that are processed by the MPIO layer 532 for delivery to the one or more storage arrays that collectively comprise a plurality of storage nodes of a distributed storage system. Paths are determined by the path selection logic 514 for sending such IO operations to the one or more storage arrays, in accordance with SLO-based rate control functionality of the IO throttling logic 515. These IO operations are sent to the one or more storage arrays in accordance with one or more scheduling algorithms, load balancing algorithms and/or other types of algorithms. Selection and/or adaptation of such algorithms can be responsive at least in part to information obtained from backpressure logic 522 of the storage array processor layer 540.

The MPIO layer 532 is an example of what is also referred to herein as a multi-path layer, and comprises one or more MPIO drivers implemented in respective host devices. Each such MPIO driver illustratively comprises respective instances of path selection logic 514 and IO throttling logic 515 configured as previously described. Additional or alternative layers and logic arrangements can be used in other embodiments.

The SLO-based queues 521 implemented in the storage array processor layer 540 comprise different sets of IO queues associated with the respective first and second target controllers of a given NVMe target or other type of target, in support of different SLOs for those respective target controllers.

In the system 500, path selection logic 514 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 5 embodiment can illustratively have the same number and type of paths to a shared storage array, or alternatively different ones of the host devices can have different numbers and types of paths to the storage array.

The path selection logic 514 of the MPIO layer 532 in this embodiment selects paths for delivery of IO operations to the one or more storage arrays having the storage array ports of the storage array port layer 538. More particularly, the path selection logic 514 determines appropriate paths over which to send particular IO operations to particular logical storage devices of the one or more storage arrays.

It is assumed in this embodiment that the host devices through their respective MPIO drivers and respective instances of path selection logic 514 and IO throttling logic 515 support different SLOs for different storage pools of the one or more storage arrays, illustratively with involvement of other system components including at least the SLO-based queues 521 and the backpressure logic 522. For example, the path selection logic 514 illustratively operates in conjunction with the IO throttling logic 515 to control the manner in which IO operations are sent to the one or more storage arrays for different QoS levels. Other host device entities can similarly utilize the path selection logic 514 and IO throttling logic 515 to support different QoS levels for different IO operations as disclosed herein, based at least in part on separate backpressure information provided by the backpressure logic 522 for the respective first and second target controllers of a storage-side target.

Some implementations of the system 500 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions. Dynamic changes in zoning configurations as disclosed herein are carried out at least in part by interaction between the path selection logic 514 and FC switches of the switch fabric layer 536.

A given host device of system 500 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

These and other features of illustrative embodiments disclosed herein are examples only, and should not be construed as limiting in any way. Other types of multiple target controller arrangements supporting different SLOs may be used in other embodiments, and the term "multiple target controllers" as used herein is intended to be broadly construed.

The above-described illustrative embodiments can provide significant advantages over conventional approaches.

For example, some embodiments provide multiple distinct SLOs for respective storage pools by configuring a storage system target to include multiple target controllers for the respective storage pools, with each such target controller having a different IO configuration based on its corresponding SLO.

Illustrative embodiments can advantageously facilitate the implementation of SLOs in conjunction with utilization of advanced storage access protocols such as NVMeF or NVMe/TCP in software-defined storage systems and other types of distributed storage systems.

Furthermore, some embodiments can be implemented without requiring any change in the NVMe specification or other storage access protocol specification.

Moreover, these and other embodiments can help to ensure high throughput and low latency for critical applications or processes.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and distributed storage systems with multiple target controller functionality will now be described in greater detail with reference to FIGS. 6 and 7. Although described in the context of system 100, these platforms may also be used to implement at least portions of other information processing systems in other embodiments.

Figure 6:
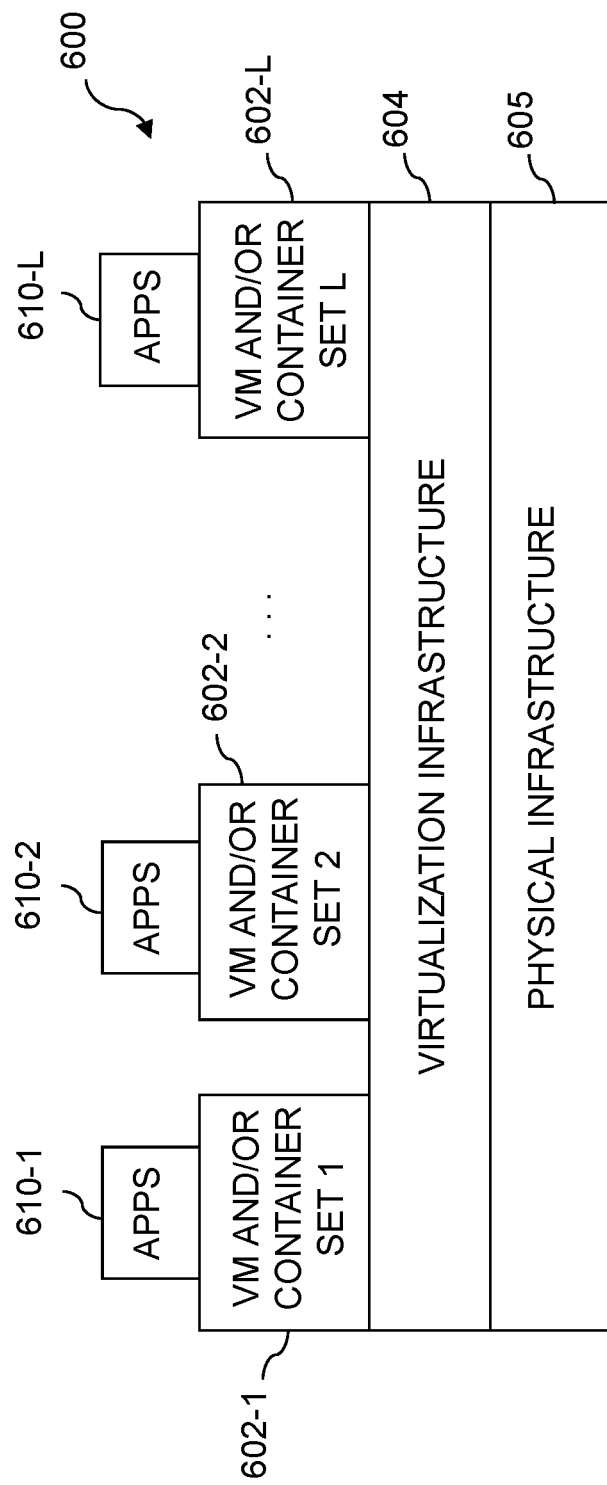
FIGS. 6 and 7 show examples of processing platforms that may be utilized to implement at least a portion of an information processing system in illustrative embodiments.
Figure 7:
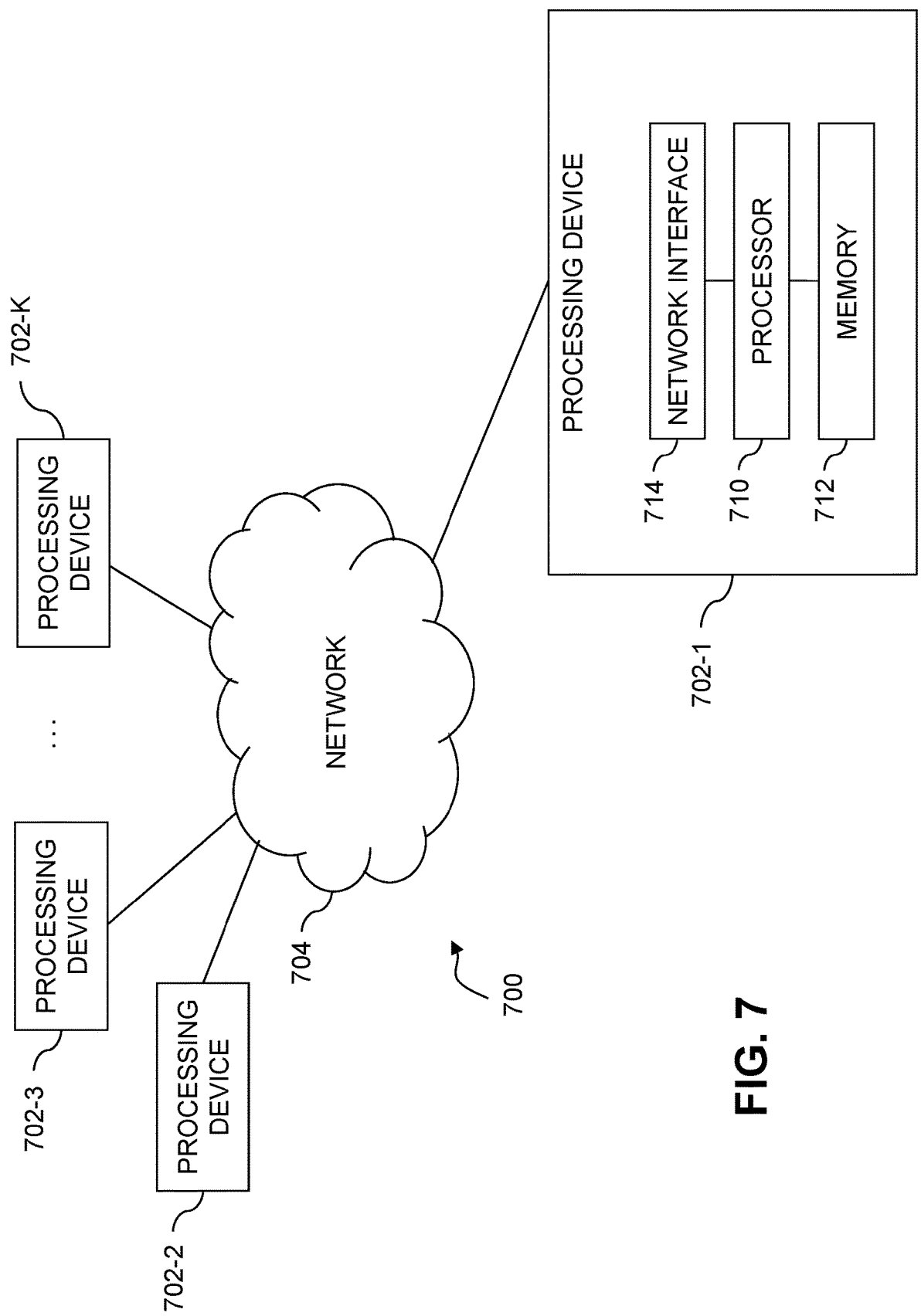

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide multiple target controller functionality in a distributed storage system of the type described above using one or more processes running on a given one of the VMs. For example, each of the VMs can implement logic instances and/or other components for implementing functionality associated with multiple target controllers supporting different SLOs in the system 100.

A hypervisor platform may be used to implement a hypervisor within the virtualization infrastructure 604. Such a hypervisor platform may comprise an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can also provide multiple target controller functionality in a distributed storage system of the type described above. For example, a container host device supporting multiple containers of one or more container sets can implement logic instances and/or other components for implementing functionality associated with multiple target controllers supporting different SLOs in the system 100.

As is apparent from the above, one or more of the processing devices or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise various arrangements of converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the multiple target controller functionality provided by one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, initiators, targets, path selection logic instances and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured:
to implement a first target controller in a storage system, the first target controller being associated with a first storage pool of the storage system and having a first service level objective;
to implement a second target controller in the storage system, the second target controller being associated with a second storage pool of the storage system and having a second service level objective different than the first service level objective;
to process input-output (IO) operations received in the storage system from one or more host devices, with different ones of the IO operations being directed by the one or more host devices from one or more initiators of the one or more host devices to different ones of the first and second target controllers; and
to provide separate feedback information from the storage system to the one or more host devices for respective ones of the first and second target controllers;
wherein different amounts of throttling of additional IO operations are applied in the one or more host devices, responsive to the separate feedback information provided from the storage system, based at least in part on whether those additional IO operations are to be directed to the first target controller or the second target controller.

2. The apparatus of claim 1 wherein the at least one processing device comprises at least a portion of the storage system.

3. The apparatus of claim 1 wherein the storage system comprises a distributed storage system that includes a plurality of storage nodes with the first and second storage pools being distributed across the storage nodes.

4. The apparatus of claim 3 wherein the distributed storage system comprises a software-defined storage system and the storage nodes comprise respective software-defined storage server nodes of the software-defined storage system.

5. The apparatus of claim 1 wherein each of the first and second storage pools comprises one or more logical storage volumes.

6. The apparatus of claim 1 wherein providing separate feedback information from the storage system to the one or more host devices for respective ones of the first and second target controllers comprises:
providing from the storage system to at least one of the one or more host devices a first IO pressure indicator of a first type responsive to detection of an pressure condition relating to the first target controller; and
providing from the storage system to at least one of the one or more host devices a second IO pressure indicator of a second type different than the first type responsive to detection of an IO pressure condition relating to the second target controller.

7. The apparatus of claim 1 wherein the first and second target controllers are part of a single physical controller subsystem of the storage system.

8. The apparatus of claim 1 wherein the first and second target controllers comprise respective Non-Volatile Memory Express (NVMe) target controllers of an NVMe subsystem of the storage system.

9. The apparatus of claim 1 wherein the first and second target controllers are accessible via respective first and second different Transmission Control Protocol (TCP) associations between a given one of the one or more host devices and the storage system.

10. The apparatus of claim 1 wherein the first target controller comprises a first set of IO queues and the second target controller comprises a second set of IO queues, with the second set of IO queues having at least one of a different number of IO queues and a different IO queue size than the first set of IO queues, at least one of the number of IO queues and the IO queue size for each of the first and second target controllers being determined based at least in part on their respective first and second service level objectives.

11. The apparatus of claim 1 wherein the at least one processing device is further configured to migrate at least one logical storage volume from the first storage pool associated with the first target controller to the second storage pool associated with the second target controller.

12. The apparatus of claim 11 wherein in conjunction with the migration of the at least one logical storage volume from the first storage pool associated with the first target controller to the second storage pool associated with the second target controller, the at least one processing device is further configured to execute a namespace update for the first and second target controllers.

13. The apparatus of claim 11 wherein the at least one logical storage volume migrated from the first storage pool to the second storage pool is accessible to the one or more host devices through a different TCP association than that through which it was accessible to the one or more host devices prior to its migration.

14. The apparatus of claim 1 wherein the first and second target controllers comprise respective virtual target controllers associated with a single physical controller subsystem of the storage system.

15. A computer program product comprising a non-transitory processor-readable storage medium having stored therein program code of one or more software programs, wherein the program code when executed by at least one processing device comprising a processor coupled to a memory, causes the at least one processing device:
to implement a first target controller in a storage system, the first target controller being associated with a first storage pool of the storage system and having a first service level objective;
to implement a second target controller in the storage system, the second target controller being associated with a second storage pool of the storage system and having a second service level objective different than the first service level objective;
to process input-output (IO) operations received in the storage system from one or more host devices, with different ones of the IO operations being directed by the one or more host devices from one or more initiators of the one or more host devices to different ones of the first and second target controllers; and
to provide separate feedback information from the storage system to the one or more host devices for respective ones of the first and second target controllers;
wherein different amounts of throttling of additional IO operations are applied in the one or more host devices, responsive to the separate feedback information provided from the storage system, based at least in part on whether those additional IO operations are to be directed to the first target controller or the second target controller.

16. The computer program product of claim 15 wherein the first and second target controllers are part of a single physical controller subsystem of the storage system.

17. The computer program product of claim 15 wherein the first target controller comprises a first set of IO queues and the second target controller comprises a second set of IO queues, with the second set of IO queues having at least one of a different number of IO queues and a different IO queue size than the first set of IO queues, at least one of the number of IO queues and the IO queue size for each of the first and second target controllers being determined based at least in part on their respective first and second service level objectives.

18. A method comprising:
implementing a first target controller in a storage system, the first target controller being associated with a first storage pool of the storage system and having a first service level objective;
implementing a second target controller in the storage system, the second target controller being associated with a second storage pool of the storage system and having a second service level objective different than the first service level objective;
processing input-output (IO) operations received in the storage system from one or more host devices, with different ones of the IO operations being directed by the one or more host devices from one or more initiators of the one or more host devices to different ones of the first and second target controllers; and
providing separate feedback information from the storage system to the one or more host devices for respective ones of the first and second target controllers;
wherein different amounts of throttling of additional IO operations are applied in the one or more host devices, responsive to the separate feedback information provided from the storage system, based at least in part on whether those additional IO operations are to be directed to the first target controller or the second target controller; and
wherein the method is performed by at least one processing device comprising a processor coupled to a memory.

19. The method of claim 18 wherein the first and second target controllers are part of a single physical controller subsystem of the storage system.

20. The method of claim 18 wherein the first target controller comprises a first set of IO queues and the second target controller comprises a second set of IO queues, with the second set of IO queues having at least one of a different number of IO queues and a different IO queue size than the first set of IO queues, at least one of the number of IO queues and the IO queue size for each of the first and second target controllers being determined based at least in part on their respective first and second service level objectives.

* * * * *